United States Patent
Lai

(10) Patent No.: US 10,715,578 B2
(45) Date of Patent: Jul. 14, 2020

(54) PROJECTOR SYSTEM AND PROJECTOR SETTING METHOD

(71) Applicant: Coretronic Corporation, Hsin-Chu (TW)

(72) Inventor: Hsin-Ya Lai, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/690,046

(22) Filed: Nov. 20, 2019

(65) Prior Publication Data

US 2020/0169595 A1  May 28, 2020

(30) Foreign Application Priority Data

Nov. 26, 2018  (CN) .......................... 2018 1 1414866

(51) Int. Cl.
*H04L 29/08* (2006.01)
*G03B 21/54* (2006.01)
*G03B 21/00* (2006.01)

(52) U.S. Cl.
CPC ............ *H04L 67/025* (2013.01); *G03B 21/54* (2013.01); *G03B 21/003* (2013.01)

(58) Field of Classification Search
CPC ...... G03B 21/54; G03B 21/003; H04L 67/025
USPC ........................................................ 353/120
See application file for complete search history.

(56) References Cited

U.S. PATENT DOCUMENTS

| 2012/0050698 A1* | 3/2012 | Kotani | G03B 21/14 353/94 |
| 2014/0354611 A1* | 12/2014 | Monden | G06F 3/1423 345/204 |
| 2019/0149783 A1* | 5/2019 | Kotani | G03B 37/04 353/94 |

FOREIGN PATENT DOCUMENTS

| CN | 107797364 | 3/2018 |
| TW | I239767 | 9/2005 |

\* cited by examiner

*Primary Examiner* — Jerry L Brooks
(74) *Attorney, Agent, or Firm* — JCIPRNET

(57) ABSTRACT

The disclosure proposes a projector system and a projector setting method. The projector system includes: a plurality of projectors including a first projector and at least one second projector, wherein the first projector is connected to the at least one second projector via a network. The first projector receives a plurality of set values and stores the set values as a configuration. The first projector acquires an Internet Protocol address corresponding to the at least one second projector. The first projector receives a copy command, and transmits the configuration to the at least one second projector according to the Internet Protocol address of the at least one second projector. The at least one second projector performs a setting operation according to the configuration. The projector setting method suitable for the projector system. In the disclosure, the configuration can be copied between a plurality of projectors faster and more conveniently.

12 Claims, 5 Drawing Sheets

192 . 168 . 0 . 102 ✓

PROJECTOR SYSTEM AND PROJECTOR SETTING METHOD

CROSS-REFERENCE TO RELATED APPLICATION

This application claims the priority benefit of China application serial no. 201811414866.1, filed on Nov. 26, 2018. The entirety of the above-mentioned patent application is hereby incorporated by reference herein and made a part of this specification.

BACKGROUND

Technical Field

The disclosure relates to a projector system and a projector setting method, and particularly relates to a projector system and a projector setting method for setting one to a plurality of projectors.

Related Art

In applications of projectors, it is often necessary to install a plurality of projectors at a time, for example, in batch installation for a school, a banquet hall or the like. In the installation, it is desired that each projector have the same settings including color settings, display settings and so on. It may take too much time to set each option of each projector one by one with a remote control. Existing solutions include the following. The settings of one projector are copied using a universal serial bus (USB) flash drive, and the USB flash drive is then inserted into another projector to copy the settings from the USB flash drive. Alternatively, a computer is connected to a projector via its USB port to copy the settings from the projector. When the projector is installed overhead, it is difficult to climb up there to connect to a USB port of the projector. Therefore, how to set a plurality of projectors is a goal that those skilled in the art should strive for.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projector system and a projector setting method, by which one to a plurality of projectors can be set.

The disclosure proposes a projector system, including: a plurality of projectors including a first projector and at least one second projector, wherein the first projector is connected to the at least one second projector via a network. The first projector receives a plurality of set values and stores the set values as a configuration. The first projector acquires an Internet Protocol address corresponding to the at least one second projector. The first projector receives a copy command, and transmits the configuration to the at least one second projector according to the Internet Protocol address of the at least one second projector. The at least one second projector performs a setting operation according to the configuration.

The disclosure proposes a projector setting method suitable for a projector system including a plurality of projectors. The projectors include a first projector and at least one second projector, wherein the first projector is connected to the at least one second projector via a network. The projector setting method includes the following. By the first projector, a plurality of set values are received and stored as a configuration. By the first projector, an Internet Protocol address corresponding to the at least one second projector is acquired. By the first projector, a copy command is received, and the configuration is transmitted to the at least one second projector according to the Internet Protocol address of the at least one second projector. By the at least one second projector, a setting operation is performed according to the configuration.

Based on the above, in the projector system and the projector setting method of the disclosure, firstly, the first projector is set and the configuration is stored; then, the configuration is transmitted to other projectors via the network so that the other projectors can perform the setting operation according to the configuration. The first projector first acquires Internet Protocol addresses of the other projectors and then transmits the configuration.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
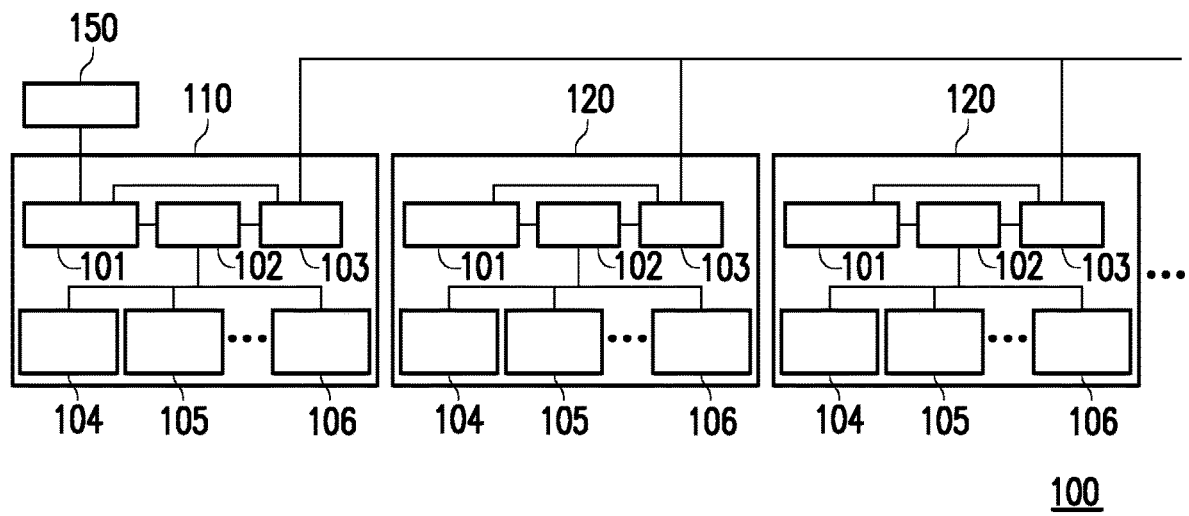
FIG. 1 is a block diagram of a projector system according to an embodiment of the disclosure.

FIG. 1 is a block diagram of a projector system according to an embodiment of the disclosure.

Referring to FIG. 1, a projector system 100 according to an embodiment of the disclosure includes a first projector 110 and a plurality of second projectors 120. Both the first projector 110 and the second projector 120 include an input unit 101, a processor 102, a networking chip 103, and functional units of a general projector that are coupled to the processor 102, such as an excitation light source driving unit 104, a projection lens adjusting unit 105, a fan driving unit 106 and so on. The input unit 101 may include an infrared sensor and a keyboard, and may receive an input signal generated by a user 150 using an input device (e.g. a remote control or a projector keypad). The input signal is, for example, an infrared signal generated by the user 150 pressing the remote control or a signal generated by the user 150 pressing the keypad on a projector housing. The processor 102 is, for example, a microprocessor control unit (MCU) or other similar element. The networking chip 103 supports wired or wireless network connectivity and includes a storage space. This storage space is provided by, for example, an embedded multimedia card (eMMC), a flash memory, or other similar element.

Figure 2:
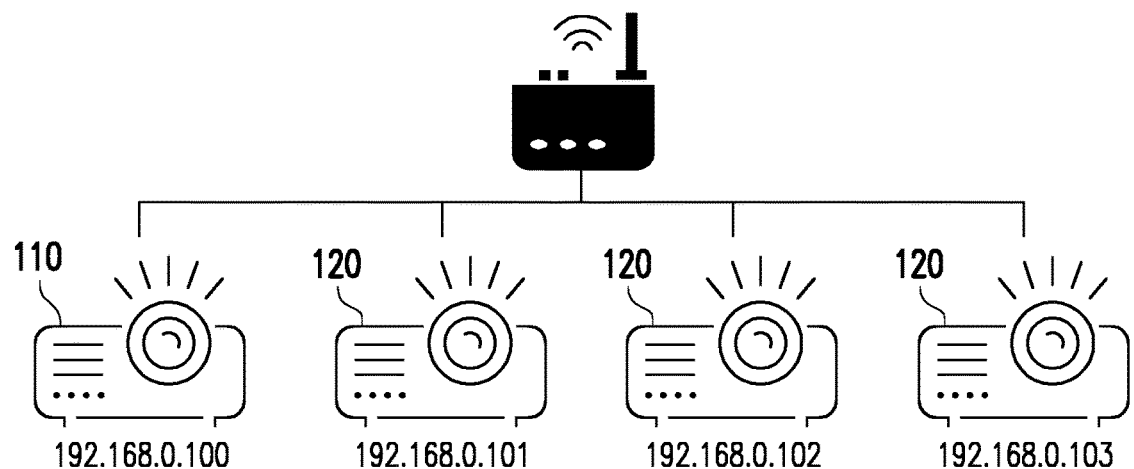
FIG. 2 is a schematic diagram of the projector system according to an embodiment of the disclosure.

FIG. 2 is a schematic diagram of the projector system according to an embodiment of the disclosure.

Referring to FIG. 1 and FIG. 2, the projector system 100 according to an embodiment of the disclosure includes the first projector 110 and the second projectors 120. The first projector 110 and the second projectors 120 may connect to each other via a wired or wireless network, and the first projector 110 may transmit a command to the second projectors 120. In an embodiment, the wired or wireless network may be a local area network (LAN). The first projector 110 and the second projectors 120 may be set within the same domain, for example, within the same intranet or the same extranet. For example, Internet Protocol (IP) addresses of the first projector 110 and the second projectors 120 may be 192.168.0.100, 192.168.0.101, 192.168.0.102, and 192.168.0.103, respectively. Whether the user 150 inputs information through the remote control or the keypad, the user 150 may adjust the first projector 110 according to an input interface of an on-screen display (OSD) projected by the first projector 110 on a screen.

In an embodiment, the processor 102 of the first projector 110 may detect the second projector 120 of the same model or of a different model within the same domain through a device search protocol (e.g., Apple's Bonjour protocol) in the same domain. Each second projector 120 may store a resident service program (e.g., a daemon) in the storage space of the networking chip 103 therein to wait for connection with other projectors. When the first projector 110 receives a plurality of set values input by the user 150 and stores the set values as a configuration, the first projector 110 may copy the configuration stored in the first projector 110 to the second projectors 120 within the same domain according to a copy command, and the second projectors 120 perform a setting operation according to the configuration of the first projector 110.

In an embodiment, the configuration may include projector settings, such as color settings such as hue, saturation, gain, contrast, brightness and so on, language settings, signal source settings, photo settings (e.g., video mode or presentation mode), stitching settings, 2D/3D conversion settings, aspect ratio settings and so on.

Figure 3:
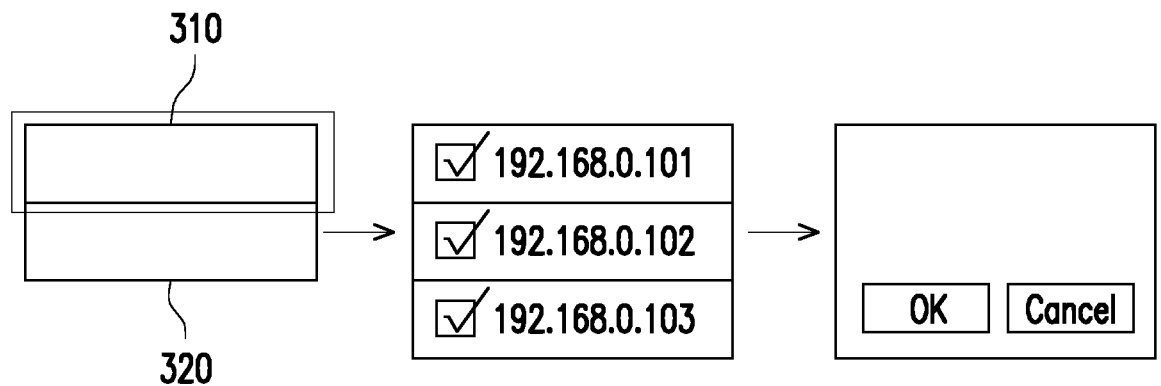
FIG. 3 is a schematic diagram of copying a configuration to other projectors according to an embodiment of the disclosure.

FIG. 3 is a schematic diagram of copying a configuration to a projector according to an embodiment of the disclosure.

Referring to FIG. 1 and FIG. 3, when the user 150 selects an option 310 representing "copy a configuration to a projector" on the OSD of the first projector 110, the OSD displays the IP address of the second projector 120 detected by the first projector 110 in the same domain and allows the user 150 to make selection by checking a checkbox (i.e., the first projector 110 receives input data corresponding to the IP address of the second projector 120). FIG. 3 illustrates that the first projector 110 detects the IP addresses of three second projectors and the checkboxes for the three IP addresses are checked. When the user 150 presses "OK", the first projector 110 receives the copy command and transmits the configuration of the first projector 110 to all of the second projectors 120 with their checkboxes checked by the user 150, such that the second projectors 120 with their checkboxes checked apply the configuration of the first projector 110 (i.e., perform the setting operation according to the configuration of the first projector 110). An operation in which the user 150 selects an option 320 representing "copy a configuration from a projector" will be explained below.

Figure 4:
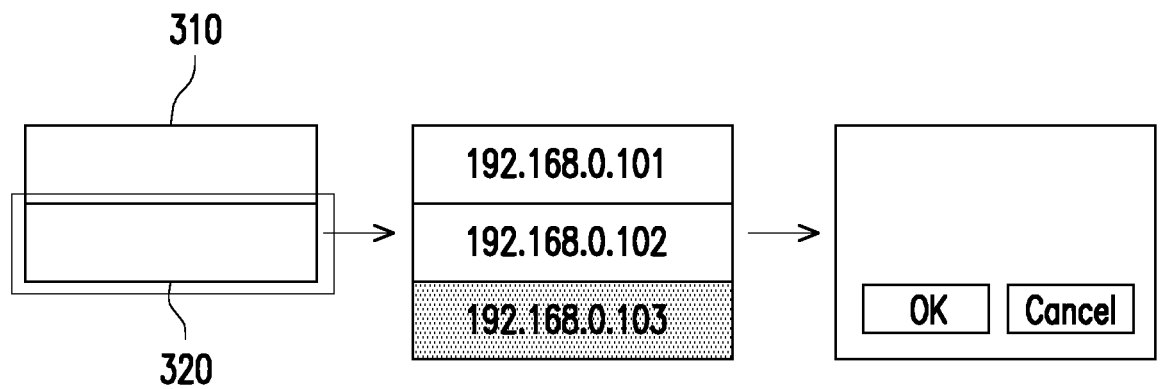
FIG. 4 is a schematic diagram of copying a configuration from other projectors according to an embodiment of the disclosure.

FIG. 4 is a schematic diagram of copying a configuration from a projector according to an embodiment of the disclosure.

Referring to FIG. 1 and FIG. 4, when the user 150 selects the option 320 representing "copy a configuration from a projector" on the OSD of the first projector 110, the OSD displays the IP address of the second projector 120 detected by the first projector 110 in the same domain, and allows the user 150 to select one of the second projectors 120 (e.g., select the second projector with the IP address of 192.168.0.103). When the user 150 presses "OK", the configuration of the selected second projector 120 is transmitted to the first projector 110, such that the first projector 110 can apply the configuration of the selected second projector 120.

Figures 5, 6:
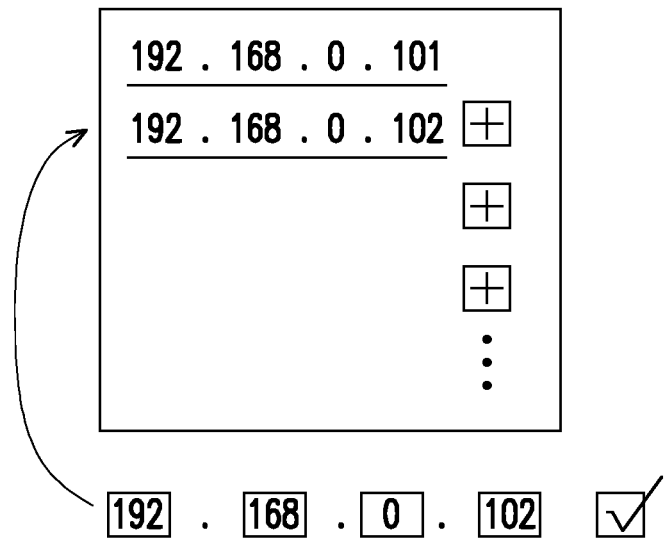
FIG. 5 is a schematic diagram of copying a configuration to other projectors according to another embodiment of the disclosure.
FIG. 6 is a schematic diagram of copying a configuration from other projectors according to another embodiment of the disclosure.

FIG. 3 and FIG. 4 illustrate that, after the user 150 selects the option 310 representing "copy a configuration to a projector" or the option 320 representing "copy a configuration from a projector", the first projector 110 automatically detects other projectors within the domain and displays their IP addresses on the OSD. In another embodiment, after the user 150 selects the option 310 representing "copy a configuration to a projector" or the option 320 representing "copy a configuration from a projector", the user 150 may manually input an IP address so as to select the second projector 120 to which or from which the configuration is to be copied. If the user 150 selects the option 310 representing "copy a configuration to a projector", the user 150 may manually input one to a plurality of IP addresses so as to select the IP address of a projector to which the configuration is to be copied, as shown in FIG. 5. If the user 150 selects the option 320 representing "copy a configuration from a projector", the user 150 may manually input a single IP address so as to assign the IP address of a projector from which the configuration is to be copied, as shown in FIG. 6.

It is worth noting that, the second projector 120 may also receive the configuration from the first projector 110 when in an off state. The second projector 120 may change a set value according to the configuration and store the changed set value in the storage space of the networking chip 103 therein. When the second projector 120 is turned on (i.e., a light source is turned on), the second projector 120 applies the updated set value to project an image. As clear from the above description, the second projector 120 is capable of enabling a network connection function and receiving the configuration even in the off state.

Figure 7:
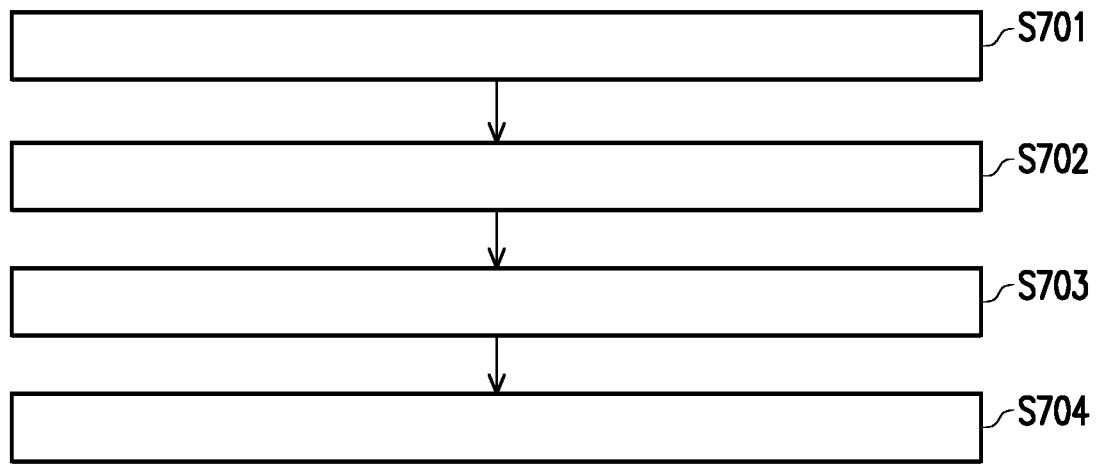
FIG. 7 is a flowchart of a projector setting method according to an embodiment of the disclosure.

FIG. 7 is a flowchart of a projector setting method according to an embodiment of the disclosure.

Referring to FIG. 7, in step S701, the user 150 turns on the first projector 110 and connects the first projector 110 and the second projectors 120 to a network.

In step S702, the first projector 110 is set through the OSD of the first projector 110.

In step S703, a plurality of set values are received and stored as a configuration by the first projector 110. Moreover, an option of "copy a configuration to a projector" is selected on the OSD of the first projector 110, and the IP address of the second projector 120 to which the configuration is to be copied is selected by checking a checkbox.

In step S704, after "OK" is pressed, the configuration of the first projector 110 is copied to the second projector 120 with its checkbox checked, and setting of the second projector 120 is completed.

Figure 8:
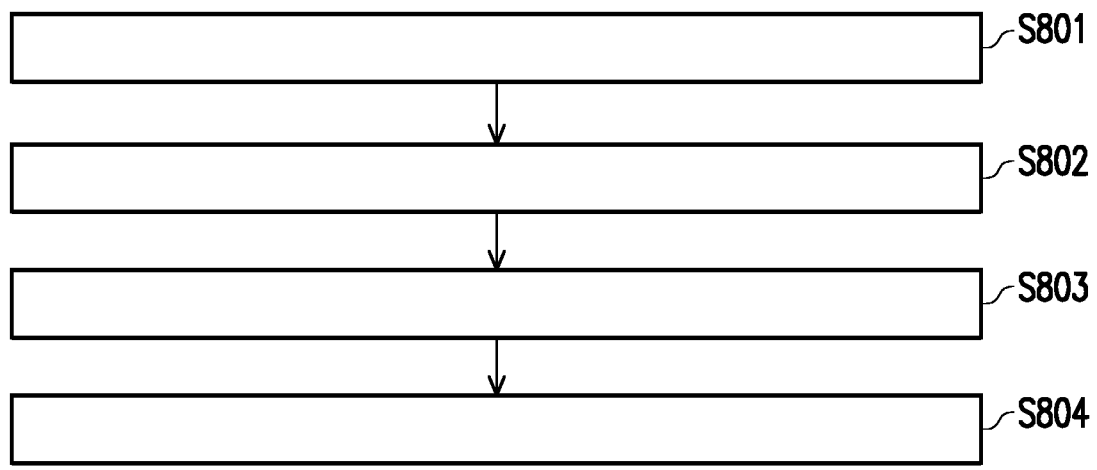
FIG. 8 is a flowchart of a projector setting method according to another embodiment of the disclosure.

FIG. 8 is a flowchart of a projector setting method according to another embodiment of the disclosure.

Referring to FIG. 8, in step S801, the user 150 turns on the first projector 110 and connects the first projector 110 and the second projectors 120 to a network.

In step S802, the first projector 110 is set through the OSD of the first projector 110.

In step S803, an option of "copy a configuration from a projector" is selected through the OSD of all the second projectors 120, and the IP address of the first projector 110 that has been set is selected by checking a checkbox.

In step S804, after "OK" is pressed, the second projectors 120 transmit a setting request to the first projector 110 and the first projector 110 transmits the configuration to the second projectors 120 according to the setting request (copy the configuration from the first projector 110), and setting of all the second projectors 120, respectively, is completed.

Figure 9:
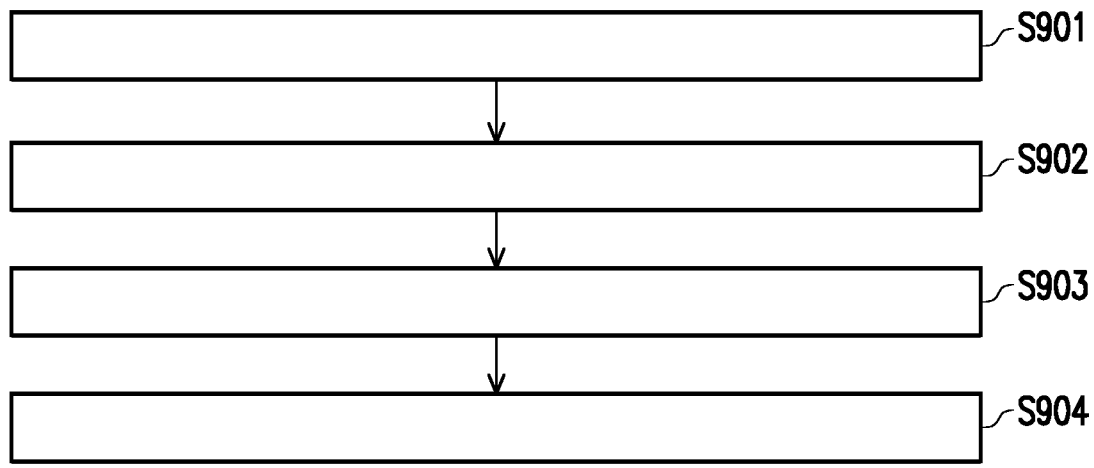
FIG. 9 is a flowchart of a projector setting method according to another embodiment of the disclosure.

FIG. 9 is a flowchart of a projector setting method according to another embodiment of the disclosure.

Referring to FIG. 9, in step S901, the user 150 turns on the first projector 110 and connects the first projector 110 and the second projectors 120 to a network.

In step S902, the first projector 110 is set through the OSD of the first projector 110.

In step S903, a plurality of set values are received and stored as a configuration by the first projector 110. Moreover, the option of "copy a configuration to a projector" is selected on the OSD of the first projector 110, and the IP address of the second projector 120 to which the configuration is to be copied is manually input and selected.

In step S904, after "OK" is pressed, the configuration of the first projector 110 is copied to all of the selected second projectors 120, and setting of all of the selected second projectors 120.

Figure 10:
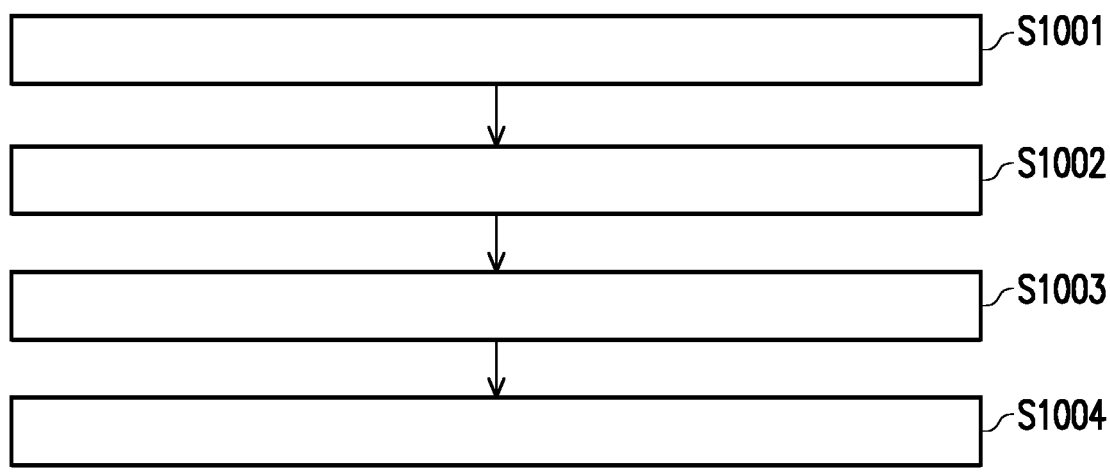
FIG. 10 is a flowchart of a projector setting method according to another embodiment of the disclosure.

FIG. 10 is a flowchart of a projector setting method according to another embodiment of the disclosure.

Referring to FIG. 10, in step S1001, the user 150 turns on the first projector 110 and connects the first projector 110 and the second projectors 120 to a network.

In step S1002, the first projector 110 is set through the OSD of the first projector 110.

In step S1003, the option of "copy a configuration from a projector" is selected through the OSD of all the second projectors 120, and the IP address of the first projector 110 that has been set is manually input.

In step S1004, after "OK" is pressed, the second projector 120 copies the configuration from the first projector 110, and setting of all the second projectors 120, respectively, is completed.

In summary, in the projector system and the projector setting method of the disclosure, firstly, the first projector is set and the configuration is stored; then, the configuration is transmitted to other projectors via the network so that the other projectors can perform the setting operation according to the configuration. The first projector first acquires Internet Protocol addresses of the other projectors via the network and then transmits the configuration. In another respect, the other projectors may acquire the Internet Protocol address of the first projector that has been set and acquires the configuration from the first projector, so as to perform the setting operation. Therefore, without an additional external apparatus such as a computer or an electronic device, the configuration can be copied between a plurality of projectors, thereby improving user convenience in operation.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projector system, comprising a plurality of projectors, wherein:
   the projectors comprise a first projector, at least one second projector and a third projector, the first projector is connected to the at least one second projector and the third projector via a local area network, wherein
   the first projector receives a plurality of set values and stores the set values as a configuration,
   the first projector acquires an Internet Protocol address corresponding to the at least one second projector,
   the first projector receives a copy command, and transmits the configuration to the at least one second projector according to the Internet Protocol address of the at least one second projector,
   the at least one second projector performs a setting operation according to the configuration,
   the third projector detects Internet Protocol addresses of the projectors in the local area network, and selects the Internet Protocol address of the first projector from the Internet Protocol addresses of the projectors, and
   when the third projector receives input data corresponding to the Internet Protocol address of the first projector, the third projector transmits a setting request to the first projector, and the first projector transmits the configuration to the third projector according to the setting request.

2. The projector system according to claim 1, wherein the first projector detects the Internet Protocol address of the at least one second projector in the local area network.

3. The projector system according to claim 1, wherein the first projector receives at least one input data corresponding to the Internet Protocol address of the at least one second projector from an input device.

4. The projector system according to claim 3, wherein the input device comprises a remote control and a keypad of the first projector.

5. The projector system according to claim 1, wherein each of the projectors comprises a networking chip, the projectors are connected to each other in the network through the networking chips, the first projector transmits the configuration to the at least one second projector, the at least one second projector is in an off state and receives the configuration, and stores the configuration in a storage space of the networking chip corresponding thereto.

6. A projector setting method, the projector setting method applied to a projector system comprising a plurality of projectors, the projectors comprising a first projector at least one second projector and a third projector, the first projector being connected to the at least one second projector and the third projector via a local area network, wherein the projector setting method comprises:
   by the first projector, receiving a plurality of set values and storing the set values as a configuration,
   by the first projector, acquiring an Internet Protocol address corresponding to the at least one second projector,
   by the first projector, receiving a copy command, and transmitting the configuration to the at least one second projector according to the Internet Protocol address of the at least one second projector,
   by the at least one second projector, performing a setting operation according to the configuration,
   by the third projector, detecting Internet Protocol addresses of the projectors in the local area network, and selecting the Internet Protocol address of the first projector from the Internet Protocol addresses of the projectors,
   by the third projector, transmitting a setting request to the first projector when the third projector receives input data corresponding to the Internet Protocol address of the first projector, and
   by the first projector, transmitting the configuration to the third projector according to the setting request.

7. The projector setting method according to claim 6, wherein the first projector detects the Internet Protocol address of the at least one second projector in the local area network.

8. The projector setting method according to claim 6, wherein the first projector receives at least one input data corresponding to the Internet Protocol address of the at least one second projector from an input device.

9. The projector setting method according to claim 8, wherein the input device comprises a remote control and a keypad of the first projector.

10. The projector setting method according to claim 8, wherein each of the projectors comprises a networking chip, the projectors are connected to each other in the network through the networking chips, the first projector transmits the configuration to the at least one second projector, the at least one second projector is in an off state and receives the configuration, and stores the configuration in a storage space of the networking chip corresponding thereto.

11. A projector system, comprising a plurality of projectors, wherein:
   the projectors comprise a first projector, at least one second projector and a third projector, the first projector is connected to the at least one second projector and the third projector via a network, wherein
   the first projector receives a plurality of set values and stores the set values as a configuration,
   the first projector acquires an Internet Protocol address corresponding to the at least one second projector,
   the first projector receives a copy command, and transmits the configuration to the at least one second projector according to the Internet Protocol address of the at least one second projector,
   the at least one second projector performs a setting operation according to the configuration, and
   when the third projector receives input data corresponding to an Internet Protocol address of the first projector from an input device, the third projector transmits a setting request to the first projector, and the first projector transmits the configuration to the third projector according to the setting request.

12. A projector setting method, the projector setting method applied to a projector system comprising a plurality of projectors, the projectors comprising a first projector, at least one second projector and a third projector, the first projector being connected to the at least one second projector and the third projector via a network, wherein the projector setting method comprises:
   by the first projector, receiving a plurality of set values and storing the set values as a configuration,
   by the first projector, acquiring an Internet Protocol address corresponding to the at least one second projector,
   by the first projector, receiving a copy command, and transmitting the configuration to the at least one second projector according to the Internet Protocol address of the at least one second projector, by the at least one second projector, performing a setting operation according to the configuration, by the third projector, transmitting a setting request to the first projector when the third projector receives input data corresponding to an Internet Protocol address of the first projector from an input device, and by the first projector, transmitting the configuration to the third projector according to the setting request.

\* \* \* \* \*